United States Patent
Frenne et al.

(10) Patent No.: US 10,530,449 B2
(45) Date of Patent: ***Jan. 7, 2020

(54) REPORTING OF CHANNEL STATE INFORMATION

(71) Applicant: HUAWEI TECHNOLOGIES CO., LTD., Shenzhen, Guangdong (CN)

(72) Inventors: Mattias Frenne, Uppsala (SE); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,460

(22) Filed: Dec. 28, 2017

(65) Prior Publication Data

US 2018/0123670 A1 May 3, 2018

Related U.S. Application Data

(63) Continuation of application No. 14/621,350, filed on Feb. 12, 2015, now Pat. No. 9,876,550, which is a
(Continued)

(30) Foreign Application Priority Data

Jan. 8, 2010 (SE) ...................................... 1000015
Jan. 8, 2010 (SE) ................... PCT/SE2010/000002

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 7/0469* (2013.01);
(Continued)

(58) Field of Classification Search
CPC .. H04B 7/0413; H04B 7/0452; H04B 7/0456; H04B 7/0486; H04B 7/02; H04B 7/00; H04B 7/0417; H04B 7/0639
See application file for complete search history.

(56) References Cited

U.S. PATENT DOCUMENTS 7,970,073 B2 6/2011 Chae et al.
7,986,972 B2 7/2011 Kim et al.
(Continued)

FOREIGN PATENT DOCUMENTS

CN 101262309 A 9/2008
CN 101594208 A 12/2009
(Continued)

OTHER PUBLICATIONS

Qualcomm Europe:"Downlink RS strucyure in support of higher-order MIMO", 3rd GenerationPartnership Project Mobile Competence Centre; R1-092228, No. San Francisco .USA, May 7, 2009, XP050339650, 14 pages.
(Continued)

*Primary Examiner* — Jean B Corrielus
(74) *Attorney, Agent, or Firm* — Kilpatrick Townsend & Stockton LLP

(57) ABSTRACT

A mobile station is connected to a multi-carrier cellular communication system having a plurality of sub-carriers. The sub-carriers are classified into K frequency sub-bands, channel state information (CSI) of the frequency sub-bands is represented by matrices $W^i$ (i=0 ... K−1), where K is an integer grater than 1. The mobile station determines a first sub-index $k_1$ for the K matrices $W^i$ (i=0 ... K−1), and a second sub-index $k_2$ for each one of the K matrices $W^i$ (i=0 ... K−1). The first sub-index $k_1$ is common for all frequency sub-bands, and the second sub-index $k_2$ is specific for the indexed matrix that corresponds to one frequency sub-band. The mobile station reports to a base station of the
(Continued)

Computing $k_1$ as common for all sub-bands

↓

Computing $k_2$ individually for each sub-band, conditioned on selected $k_1$

↓

Reporting (transmitting) one $k_1$ and at least one $k_2$ per sub-band, effectively one $k_1,k_2$ index pair per sub-band, wherein $k_1$ and $k_2$ have different time-frequency reporting granularity multi-carrier cellular communication system the first sub-index $k_1$ and at least one second sub-index $k_2$.

20 Claims, 5 Drawing Sheets

Related U.S. Application Data continuation of application No. 13/784,312, filed on Mar. 4, 2013, now Pat. No. 8,983,001, which is a continuation of application No. 13/544,878, filed on Jul. 9, 2012, now Pat. No. 8,837,607, which is a continuation of application No. PCT/CN2010/079938, filed on Dec. 17, 2010.

(51) Int. Cl.
  *H04B 7/10* (2017.01)
  *H04B 7/0456* (2017.01)
  *H04W 72/04* (2009.01)

(52) U.S. Cl.
  CPC ........... *H04B 7/0478* (2013.01); *H04B 7/066* (2013.01); *H04B 7/0634* (2013.01); *H04B 7/0639* (2013.01); *H04B 7/10* (2013.01); *H04W 72/0453* (2013.01)

(56) References Cited

U.S. PATENT DOCUMENTS

| | | | |
|---|---|---|---|
| 8,243,610 B2 | 8/2012 | Rong et al. | |
| 8,271,023 B2 | 9/2012 | Khojastepour | |
| 8,331,310 B2 | 12/2012 | Wang et al. | |
| 8,379,753 B2 | 2/2013 | Khojastepour et al. | |
| 8,611,243 B2 | 12/2013 | Ko et al. | |
| 2007/0086540 A1 | 4/2007 | Chae et al. | |
| 2007/0249401 A1 | 10/2007 | Kim et al. | |
| 2008/0037669 A1 | 2/2008 | Pan et al. | |
| 2008/0043867 A1 | 2/2008 | Blanz et al. | |
| 2009/0046569 A1 | 2/2009 | Chen et al. | |
| 2009/0190528 A1 | 7/2009 | Chung et al. | |
| 2009/0274225 A1 | 11/2009 | Khojastepour et al. | |
| 2009/0274230 A1 | 11/2009 | Heath, Jr. et al. | |
| 2010/0239037 A1 | 9/2010 | Tang et al. | |
| 2011/0080969 A1 | 4/2011 | Joengren et al. | |
| 2011/0122968 A1 | 5/2011 | Jongren et al. | |
| 2011/0150052 A1 | 6/2011 | Erell et al. | |
| 2012/0087425 A1 | 4/2012 | Gomadam et al. | |
| 2012/0201165 A1 | 8/2012 | Ko et al. | |
| 2012/0270535 A1 | 10/2012 | Chen et al. | |
| 2012/0302250 A1 | 11/2012 | Chen et al. | |

FOREIGN PATENT DOCUMENTS

| | | |
|---|---|---|
| EP | 1919096 A1 | 5/2008 |
| EP | 2439859 A2 | 4/2012 |
| WO | 2008109790 A1 | 9/2008 |
| WO | 2009022820 A2 | 2/2009 |
| WO | 2009096708 A1 | 8/2009 |

OTHER PUBLICATIONS

Ericsson et al :"Downlink 8 Tx Precoder Design Principles for UE Feedback", 3rd Generation Partnership Project Mobile Competence Centre, R1-094277, No. Miyazaki, Oct. 12, 2009, XP050388739, 3 pages.

Huawei :"Extension to Rel.8 PMI feedback by adaptive codebook", 3GPP Draft, 3rd Generation Partnership Project Mobile Competence Centre, R1-094695, No. Jeju; Nov. 9, 2009, XP050389099, 4 pages.

3GPP TS 36.211 V8.4.0 3rd Generation Partnership Project;Technical Specification Group Radio Access Network; Evolved Universal Terrestrial Radio Access(E-UTRA);Physical Channels and Modulation(Release 8), Technical Specification, Sep. 2008, 78 pages.

"3GPP TS 36.211 V9.0.0 3rd Generation Partnership Project;Technical Specification Group Radio Access Network; Evolved Universal Terrestrial Radio Access (E-UTRA);Physical Channels and Modulation(Release 9), Technical Specification, Dec. 2009, 85 pages".

"3GPP TS 36.213 V9.0.1 3rd Generation Partnership Project;Technical Specification Group Radio Access Network; Evolved Universal Terrestrial Radio Access (E-UTRA);Physical layer procedures(Release 9), Technical Specification, Dec. 2009, 79 pages".

ETSI TS 136 211 V8.7.0 LTE; Evolved Universal Terrestrial Radio Access (E-UTRA);Physical channels and modulation (3GPP TS 36.211 version 8.7.0 Release 8), Technical Specification, Jun. 2009, 87 pages.

Samsung, "SU-MIMO PMI feedback and Compression", 3GPP TSG RAN WG1 Meeting #51bis Seville, Spain, Jan. 14-18, 2008, R1-080053, 5 pages.

Ericsson, ST-Ericsson, "On Feedback in Support of DL Multi-Antenna Transmission", 3GPP TSG-RAN WG1 #59 Jeju, South Korea, Nov. 9-13, 2009, R1-094442, 4 pages.

REPORTING OF CHANNEL STATE INFORMATION

CROSS-REFERENCE TO RELATED APPLICATIONS

This application is a continuation of U.S. patent application Ser. No. 14/621,350, filed on Feb. 12, 2015, now U.S. Pat. No. 9,876,550. The U.S. patent application Ser. No. 14/621,350 is a continuation of U.S. patent application Ser. No. 13/784,312, filed on Mar. 4, 2013, now U.S. Pat. No. 8,983,001, which is a continuation of U.S. patent application Ser. No. 13/544,878, filed on Jul. 9, 2012, now U.S. Pat. No. 8,837,607. The U.S. patent application Ser. No. 13/544,878 is a continuation of International Application No. PCT/CN2010/079938, filed on Dec. 17, 2010. The International Application No. PCT/CN2010/079938 claims priorities to International Application No. PCT/SE2010/000002 filed on Jan. 8, 2010, and Swedish Patent Application No. SE1000015-6, filed on Jan. 8, 2010. All of the aforementioned patent applications are hereby incorporated by reference in their entireties.

TECHNICAL FIELD

The present invention relates to a method and apparatus of reporting channel state information in wireless communication. In particular embodiments, it relates to a method and apparatus of such information reporting of channel state(s) having a codebook representative.

BACKGROUND

It is well known in the art that the performance is greatly enhanced if linear precoding can be used at a transmitter side in wireless communication systems supporting multiple antenna transmissions. Such linear precoding has been implemented, e.g., in the IEEE 802.16-2005 standard and in the 3GPP Rel.8 Long Term Evolution (LTE) standard.

To support precoding at the transmitter side, the receiver, sometimes also known as a User Equipment (UE) in the Downlink (DL), needs to feed back Channel State Information (CSI) about the multi-antenna channel between transmit and receive antennas. The CSI may consist of a representation of the actual multi-antenna channel, or alternatively a preferred precoding vector/matrix which the UE has determined based on measurements on the multi-antenna channel. In the latter case, the CSI is commonly referred to as a Precoding Matrix Indicator (PMI).

To reduce feedback overhead when signalling CSI reports, quantization is required so as to represent the CSI in a finite number of bits. As an example, the 3GPP LTE Rel.8 standard use a precoding matrix codebook consisting of 64 matrices and the UE feeds back the preferred precoding matrix using six information bits.

As mentioned above, a codebook of a finite number of matrices is commonly used to quantize the CSI in which case the CSI feedback is an index to a codebook that points out the matrix in the codebook that best represents the CSI. The index is then reported to the transmit node using for instance a string of binary bits.

As the channel is frequency and time selective by nature, a CSI report is only valid with reasonable accuracy up to some maximum bandwidth and for some maximum time. If the communication system wants to support transmission bandwidths using linear precoding for larger than this maximum bandwidth, feedback of multiple CSI reports is needed and further these CSI reports need to be repeated in time with appropriate intervals.

The bandwidth and time interval of each of these CSI reports are denoted as time-frequency granularity of the CSI, and if a codebook of matrices is used to quantize the CSI, one matrix is reported per time interval and frequency bandwidth.

To meet the high requirements on data throughput in future wireless communication systems, such as the 3GPP LTE-Advanced, an even larger number of transmitter and receiver antennas are envisioned. Since the dimensions of the multi-antenna channel thereby increases, the required CSI feedback overhead will increase further, thereby hampering the desired throughput increase.

Furthermore, when the number of antennas (or antenna elements) is increased, the physical dimensions of the transmitter and receivers will also increase, which is undesirable due to the larger area of, e.g., a Base Station (BS) which will make it more vulnerable to environmental effects such as strong winds. Also, the architectural (visible) impact on buildings and the effect on landscape or cityscape should not be neglected in this context. To partly cope with the problem of larger antenna arrays dual polarized antenna elements is commonly assumed, since by utilizing two orthogonal polarizations of the electromagnetic field, one can effectively have two antennas in one. So, by utilizing polarized antennas, the total dimension of the antenna arrays is roughly halved.

Another obvious approach to make equipment with many antenna elements physically smaller is to reduce the spacing between the antenna elements. This will make signals received and transmitted more correlated (if they have the same polarization) and it is well known that the expected multiple antenna spatial multiplexing gain will be reduced. However, it is also known that correlated signals make very good and narrow beams, and the multiple antenna spatial multiplexing could then be used to transmit to users which are spatially separated. This is sometimes called Spatial Division Multiple Access (SDMA) or Multi-User MIMO (MU-MIMO). Hence, the drawback of lower per user throughput when using narrow spaced antennas elements can be compensated by transmitting to multiple users simultaneously, which will increase the total cell throughput (i.e., the sum of all users throughput in the cell).

Further, it is a known physical property that the channel emanating from antennas with orthogonal polarizations have close to independent fading. It is further known that channels emanating from closely spaced equally polarized antenna elements have correlated fading. Hence, for multi-antenna transmitters and receivers having a large number of antenna elements, compact antenna arrays which also utilize the polarization dimension is preferred. In this case, it is observed that among the antenna elements, the correlation between the radio channels between some pairs of the antenna elements is high, whereas the correlation for the radio channels between some other pairs of the antenna elements is low or even negligible. It is often said that two antennas are correlated meaning that the channel from the two antennas to any receiver antenna are correlated. This convention is used throughout the present disclosure.

In the 3GPP LTE standard specification TS 36.211, a codebook of 16 matrices is defined which facilitates feedback of dual polarized antenna arrays. Each matrix is thus indexed with a single 4 bit index. The feedback can be per sub-band which is a limited part of the total available bandwidth, or wideband which is the whole available bandwidth, i.e. the sum of all sub-bands. Hence, according to said specification a 4 bit PMI is fed back for each of N number of sub-bands, or for the wideband case. Therefore, 4*N feedback bits is needed when using the method in the TS 36.211 specification.

SUMMARY

An aspect of the present invention is to provide a method for reporting CSI with reduced overhead compared to prior art solutions. Also an aspect of the invention is to provide a method of reporting CSI with improved accuracy.

Example embodiments of the invention provide for channel state information (CSI) reporting by means of a codebook representation comprising a number of one or more matrices arranged according to two or more sub-indices between a transmit node (TN) and a receive node (RN) in a wireless communication system being arranged for providing or processing the sub-indices with index-specific time-frequency reporting granularity as further explained in the subsequent detailed description.

Thereby, CSI reporting overhead may reduce and facilitate increased uplink data throughput. CSI reporting accuracy may also improve and, e.g., result in increased downlink user throughput and increased downlink cell throughput.

Furthermore, required receiver complexity is reduced according to preferred embodiments, wherein the first sub-index is common to all sub-bands, and the selection of the first sub-index need not be repeated for every sub-band. Yet another benefit of an example embodiment of the invention is that the codebook may be structured in a suitable way for taking advantage of and transferring CSI reports according to characteristics of commonly used dual polarized antenna arrays.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 6:
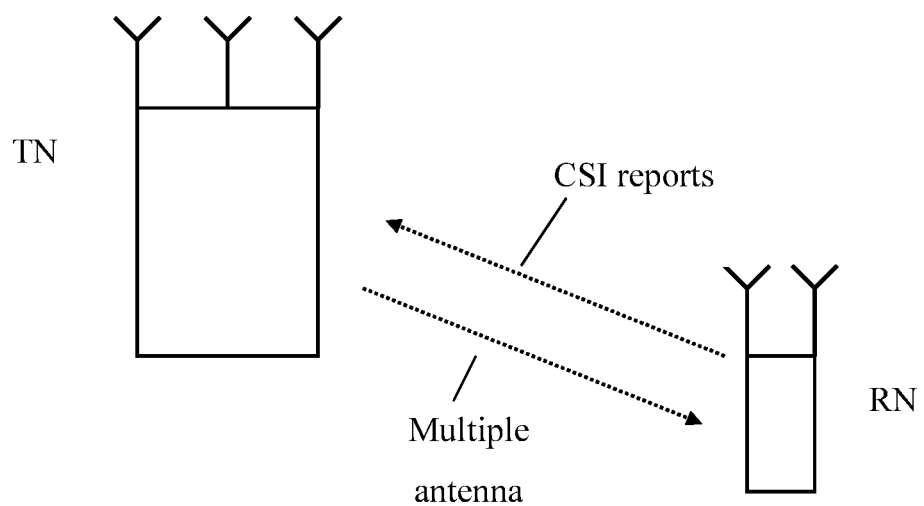
FIG. 6 shows an example of transmission between a transmit node (TN) and a receive node (RN) in a wireless communication system.

In communications relying upon, channel state information, CSI, retrieved in circuitry adapted therefore and reported/fed back from a receive node (RN) to a transmit node (TN) in a wireless communication system as shown in FIG. 6, the transmit node preferably comprises processing circuitry adapted for applying this information about the state of the radio channel to improve the subsequent multiple antenna transmission of data to the receive node.

In a multi-carrier communication system, such as LTE or LTE-A, the underlying channel for a given subcarrier between a transmit node and a receive node is preferably represented by a $N_r$ times $N_t$ matrix W, where $N_t$ is the number of transmit antennas and $N_r$ is the number of receive antennas, respectively. The CSI feedback can therefore be a quantization of the $N_r$ times $N_t$ matrix W using a codebook C of matrices, or W can also be a preferred precoding matrix having size $N_t$ times R, where $1 \leq R \leq \min(N_r, N_t)$ is the preferred transmission rank. The transmission rank, also known as the number of layers, determines the degree of spatial multiplexing in a transmission.

Since the radio channel is fading in the frequency and time domain, the selected matrix or equivalently the CSI will only be valid for some frequency bandwidth F and time interval T, which henceforth will be denoted as the time-frequency granularity of a CSI feedback report.

Figure 7:
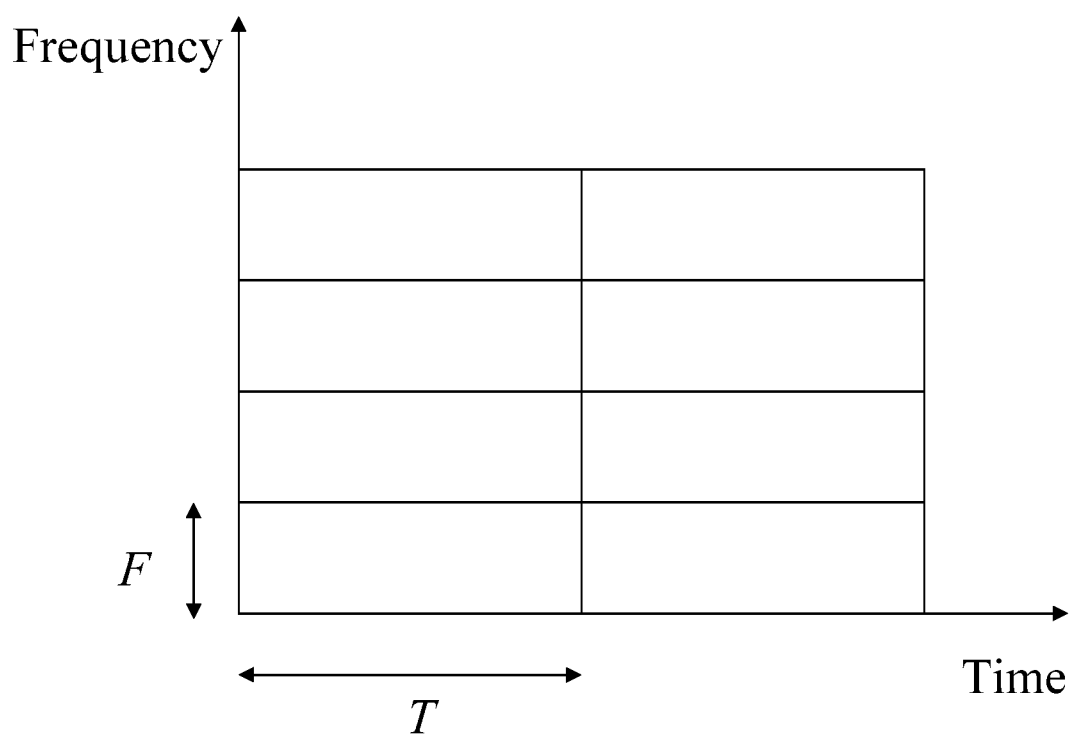
FIG. 7 shows time-frequency representation of a channel in a multi-carrier communication system, wherein each rectangle represents the time-frequency granularity by frequency bandwidth F and time duration T.

FIG. 7 illustrates time-frequency granularity for a multi-carrier communication system, wherein each rectangle represents a frequency bandwidth and a time duration for which the CSI can be considered constant or similar, and therefore one CSI report is required for each of the rectangles in FIG. 7 to accurately describe the CSI for the whole transmission bandwidth during the time interval T.

So, for reporting the CSI for a bandwidth that is K times larger than F a CSI report will consist of K number of CSIs, where each of the CSI reports reflects the channel state in a corresponding frequency bandwidth F and time interval T. A feedback report thus contains K number of matrices $W^i$ from a codebook C, where $K \geq 1$ and $i = 0 \ldots K-1$.

It has further been observed by the inventors that correlated antennas or the channel from a group of correlated antennas have a larger coherence bandwidth of the spatial correlation and longer coherence time compared to antennas, or between antenna groups with lower correlation, and could therefore have a lower granularity in its feedback. Therefore, even though a CSI feedback matrix $W^i$ has a time-frequency granularity with frequency bandwidth F and time interval T, it is possible to structure the matrix $W^i$ in such way that different sub-parts of this matrix structure has a lower time-frequency granularity, i.e., F' and/or T', or equivalently F'>F and/or T'>T. Different structures of a CSI matrix $W^i$ are covered by different embodiments of the present invention.

The exploitation of the antenna correlation in a CSI report is achieved by introducing a special structure of the matrices belonging to the codebook C, which allows for indexing the matrices in the codebook C by P number of sub-indices, where P>1. Also, by using multiple sub-indices according to the invention, each one of the sub-indices may have its own time-frequency granularity. This is an effective and low complex way of reducing the total number of bits required to report the CSI and therefore advantage over prior art.

Hence, the present invention relates to a method for reporting CSI between a transmit node and a receive node in a wireless communication system. The transmit node being arranged for multiple transmit antenna transmissions and the CSI being represented by K number of matrices $W^i$ from a codebook C comprising a plurality of matrices, wherein each matrix in the codebook C represents a state, or a preferred precoding matrix, for the multi-antenna channel from the transmit node to the receive node, $K \geq 1$ and $i=0 \ldots K-1$. The method comprises the steps of: reporting a first sub-index $k_1$; and reporting at least one additional second sub-index $k_2$ for each one of the K number of matrices $W^i$, wherein each one of the K number of matrices $W^i$ is indexed by the first $k$ and second $k_2$ sub-indices, and the first $k_1$ and second $k_2$ sub-indices have different time-frequency reporting granularity.

The invention can therefore be understood as that the first sub-index $k_1$ indicates a matrix $M_{k_1}$ from a first sub-codebook $C_1$ and that the at least one additional second sub-index $k_2$ indicates a matrix $M_{k_2}^i$ from a second sub-codebook $C_2$ so that each one of the K number of matrices $W^i$ in codebook C are generated from the first $M_{k_1}$ and second matrices $M_{k_2}^i$, which are indexed by the first $k_1$ and at least one additional second $k_2$ sub-index, respectively.

Therefore, the present invention can reduce CSI feedback overhead, or alternatively by keeping the same feedback overhead, it is possible to improve CSI feedback reporting accuracy since each feedback bits will be more efficiently utilized. This is achieved by taking advantage of the correlations of the radio channel, which is the same for common antenna setups in the art, such as a narrow spaced antenna element array with dual polarized antenna elements.

As an example of an implementation of the invention: assume a codebook C with 32 matrices, so 5 bits is required to index a matrix $W^i$ belonging to said codebook C. If the matrix $W^i$ is indexed by at least two sub-indices $k_1$, $k_2$, where a first sub-index $k_1$ is a three bit index and a second sub-index $k_2$ is a two bit index. Hence, to represent a matrix, both sub-indices $k_1$, $k_2$ are needed and in total 5 bits are used. As mentioned, the different sub-indices $k_1$ and $k_2$ are fed back with different granularity in time and/or frequency. This has feedback overhead benefits. For instance, the first sub-index $k_1$ can be reported every 10 milliseconds whereas the second sub-index $k_2$ is reported every 1 millisecond. The receiver of the feedback message thus updates the first sub-index $k_1$ in the index pair $k_1$, $k_2$ less frequently than the second sub-index $k_2$. The overhead benefits of this is arrangement is obvious; instead of feeding back 5 bits per millisecond or 5 kbit/s, the overhead has been reduced to effectively (3+2*10)/10=2.3 bits per millisecond or equivalently 2.3 kbit/s.

The same principle can be applied for reducing overhead when reporting CSI for multiple sub-bands in frequency, where the selection of the first sub-index $k_1$ can be valid for a bandwidth of 300 subcarriers, and whereas the selection of the second sub-index $k_2$ is valid for a sub-band bandwidth of 30 subcarriers. Hence, if the total bandwidth is 300 subcarriers, one first sub-index $k_1$ and ten second sub-indices $k_2$ must be reported to indicate the matrix $W^i$ of each sub-band. The feedback overhead to support per sub-band CSI feedback is thus reduced from 50 bits (if 5 bits is reported for each of the 10 sub-bands) to 23 bits (if 3 bits is used for the first sub-index $k_1$ and 2 bits for each of the second sub-indices $k_2$).

The principle can also be used to improve the accuracy of the CSI report, where the selection of the first sub-index $k_1$ can be valid for a bandwidth of 300 subcarriers, whereas the selection of the second sub-index $k_2$ is valid for a sub-band bandwidth of 15 subcarriers, which is less than the 30 subcarriers in the previous example. Due to the reduced sub-bandwidth, each CSI report will represent the CSI for a small frequency bandwidth and therefore be better matched to the radio channel, i.e., have better accuracy. Hence, assuming that the total bandwidth includes 300 subcarriers, one first sub-index $k_1$ and twenty second sub-indices k must be reported to indicate the matrix $W^i$ for each sub-band. The feedback overhead to support per sub-band CSI feedback is thus 43 bits (if 3 bits is used for the first sub-index $k_1$ and 2 bits for each of the second sub-indices $k_2$).

An alternative way to improve the accuracy of the CSI report is to increase the codebook size. Assuming that the selection of the first sub-index $k_1$ is valid for a bandwidth of 300 subcarriers, whereas the selection of the second sub-index $k_2$ is valid for a sub-band bandwidth of 30 subcarriers. Hence, if the total bandwidth is 300 subcarriers, one first sub-index $k_1$ and ten second sub-indices $k_2$ must be reported to indicate the matrix $W^i$ for each sub-band. The feedback overhead to support per sub-band CSI feedback is again 43 bits but with a larger codebook (if 3 bits is used for the first sub-index $k_1$ and 4 bits for each of the sub-indices $k_2$).

Figure 2:
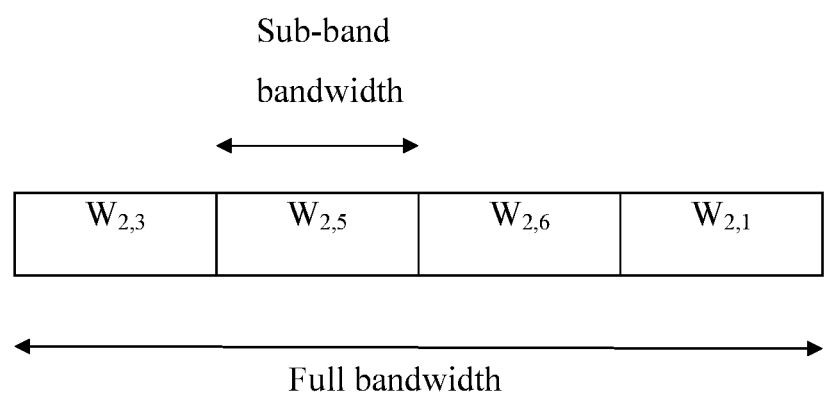
FIG. 2 is an example where a full bandwidth is divided into four sub-bands, and wherein for each sub-band a preferred precoding matrix is selected and reported. The first sub-index is the same for all sub-bands in this example, but the second sub-index may be different for each sub-band.

A further example of per sub-band CSI feedback is given in FIG. 2 where the full bandwidth is divided into four sub-bands and a matrix from a codebook with P=2 has been used, where P denotes the number of sub-indices used to index each matrix $W^i$ in the codebook C. The first sub-index for each matrix $W^i$ is common to all sub-bands and needs thus only be reported once, whereas the second sub-index is dependent on the sub-band number.

Figure 1:
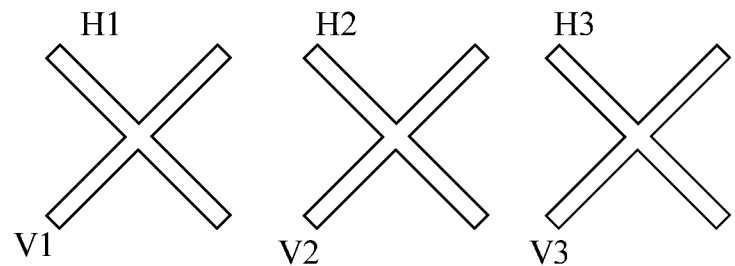
FIG. 1 is an example of a dual polarized antenna array with six antenna elements V1, V2, V3, H1, H2 and H3, wherein the elements V1, V2 and V3 have the same polarization, which is orthogonal to the polarization of antenna elements H1, H2 and H3.

In FIG. 1, a dual polarized antenna array with six antenna elements is illustrated. Each of the two polarizations creates a linear antenna array with three antenna elements. The antenna elements with the same polarization (e.g., V1 and V2) will have a high correlation (i.e., will generate channels with high correlation) if they are placed with narrow spacing, but the correlation between antenna elements with different correlation (e.g., V1 and H1) will generally have a low or a negligible correlation. This dual polarized antenna array structure is a preferred antenna setup when many antenna elements at the transmitter is desirable due to the compact size obtained by utilizing two polarization antennas. The size of the antenna array can be reduced further by selecting a small separation between antenna elements having the same polarization.

Therefore, according to an embodiment of the invention aforementioned correlation properties of dual polarized antenna arrays is taken advantage of as it is known that closely spaced antennas with the same polarization have high correlation whereas antennas with orthogonal polarizations have low correlation. If a first group of antenna elements are numbered 1 to $N_t/2$ and are arranged so that they have the same polarization and a second group of antenna elements are numbered $N_t/2+1$ to $N_t$ have the same but orthogonal polarization with respect to the first group. Then a matrix codebook C with P=2 indices can be structured as:

$$W^i = \begin{bmatrix} M_{k_1} \\ M_{k_1} M_{k_2}^i \end{bmatrix} \text{ or } W^i = \begin{bmatrix} M_{k_1} \\ M_{k_2}^i M_{k_1} \end{bmatrix}, \quad (1)$$

where the matrices $M_{k_1}$ and $M_{k_2}^i$ are taken from a first and a second sub-codebook $C_1$ and $C_2$, indexed by the first and second sub-matrices, respectively. The matrix $M_{k_1}$ then reflects the precoding matrix for correlated antenna elements and can then be optimized for this scenario using, e.g., Discrete Fourier Transform (DFT) matrices. The matrix $M_{k_2}^i$, which may be a diagonal matrix, then reflects the phase and the amplitude relationship between the two polarizations. The matrix $W^i$ is thus indexed by two sub-indices $k_1$, $k_2$, where the first sub-index $k_1$ can be reported back with lower granularity in frequency and/or time, since this sub-index corresponds to the correlated subset of antenna elements, whereas the second sub-index $k_2$ can be reported back with higher granularity in frequency and/or time (e.g., higher sampling rate in frequency and/or time), since the second sub-index corresponds to the relation between the two different polarization directions.

In another embodiment of the invention a matrix $W^i$ from the codebook C derived by two matrices from sub-codebooks $C_1$ and $C_2$ by equation (1) can also be written as:

$$W^i = \begin{bmatrix} M_{k_1} \\ M_{k_1} D_{k_2} \end{bmatrix} = \underbrace{\begin{pmatrix} M_{k_1} & 0 \\ 0 & M_{k_1} \end{pmatrix}}_{A_{k_1}} \underbrace{\begin{pmatrix} I \\ D_{k_2} \end{pmatrix}}_{B_{k_2}}, \quad (2)$$

where a product of two matrices, each with different indices describes the underlying matrix structure. Hence, in equation (2) different time-frequency granularity is used for reporting the index to the two matrices $M_{k_1}$ and $M_{k_2}^i$, respectively.

In a yet another embodiment of the invention matrices $W^i$ in codebook C with P=2 sub-indices can be structured as:

$$W^i = M_{k_2}^i \otimes M_{k_1} \text{ or } W^i = M_{k_1} \otimes M_{k_2}^i \quad (3),$$

where $\otimes$ is the Kronecker product and the matrices $M_{k_1}$ and $M_{k_2}^i$ are obtained from the sub-codebooks $C_1$ and $C_2$, respectively. The time-frequency granularity of the reporting of matrix $M_{k_1}$ may be higher or lower than for matrix $M_{k_2}^i$.

In a yet another embodiment matrices $W^i$ in codebook C with P=2 sub-indices can be structured as:

$$W^i = M_{k_2}^i M_{k_1} \text{ or } W^i = M_{k_1} M_{k_2}^i \quad (4),$$

which is a general structure where one of the matrices is the wideband representation and the other matrix is the feed back per sub-band representation.

In a further embodiment of the invention matrices $W^i$ in the codebook C are structured as:

$$W^i = \begin{bmatrix} M_{k_1} \\ M_{k_1} e^{jd_{k_2}} \end{bmatrix}, \quad (5)$$

wherein $d_{k_2}$ is a scalar.

In a further embodiment, the number of sub-indices is P=3 and matrices $W^i$ in the codebook C are indexed by three sub-indices ($k_1$, $k_2$ and $k_3$, respectively) and can be structured as:

$$W^i = \begin{bmatrix} M_{k_1} \\ M_{k_2}^i M_{k_3} \end{bmatrix} \text{ or } W^i = \begin{bmatrix} M_{k_1} \\ M_{k_3} M_{k_2}^i \end{bmatrix}, \quad (6)$$

wherein $M_{k_1}$ and $M_{k_3}$ reflects precoding matrices for correlated antennas so $k_1$, $k_3$ are reported back with lower time-frequency granularity than the second sub-index $k_2$ for the matrix $M_{k_2}^i$ which reflects the relationship between the polarizations and is thus feed back with higher granularity in frequency and/or time.

Figure 5:
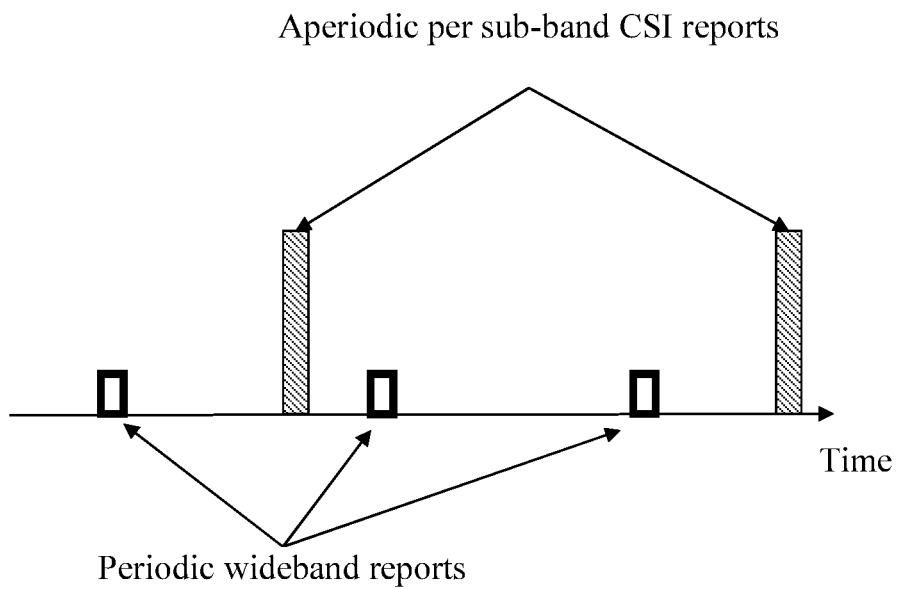
FIG. 5 shows an example of the use of wideband CSI feedback reports and per sub-band CSI feedback reports.

According to the 3GPP LTE and LTE-Advanced standards, there exist two feedback reporting possibilities, i.e. using the Physical Uplink Control Channel (PUCCH) and the Physical Uplink Shared Channel (PUSCH). The PUCCH is configured to transmit few bits (low payload) periodically, whilst the PUSCH can carry a large number of bits and is a scheduled aperiodic resource. Furthermore, a useful property of CSI feedback is that each report is self-contained meaning that one should not have to rely on multiple reports fed back at different time instants to compute the CSI for a given sub-band. Therefore, the PUCCH is suitable for wideband feedback meaning that the PUCCH contain some average CSI information for the whole feedback bandwidth. The PUSCH on the other hand which has less limitation on the payload, and thus can carry more bits, is better suited for the detailed per sub-band CSI. An example of this feedback structure is shown in FIG. 5. In this figure the height of the bars, at each reporting instant, illustrates the number of bits reported in that CSI report. The PUCCH report is periodic, whereas the PUSCH report may be aperiodic meaning that the transmitting node requests a PUSCH report when needed. It is however also possible to configure a periodic PUSCH report with some other periodicity than the PUCCH report, which is well understood by the skilled person in the art.

The use of the PUCCH for wideband feedback can be supported by the present invention by feeding back the P number of sub-indices and where there is only one sub-band spanning the whole bandwidth reflecting a wideband CSI in the PUCCH. Furthermore, overhead can be reduced further by introducing some relationship among the P indices. This can be explained by an example. Assume the matrix structure:

$$W^i = \begin{bmatrix} M_{k_1} \\ M_{k_1} e^{jd_{k_2}} \end{bmatrix}, \quad (7)$$

where the first sub-codebook $C_1$ for the matrix $M_{k_1}$ is given by:

$$C_1 = \left\{ \begin{bmatrix} 1 \\ 1 \end{bmatrix}, \begin{bmatrix} 1 \\ -1 \end{bmatrix}, \begin{bmatrix} 1 \\ i \end{bmatrix}, \begin{bmatrix} 1 \\ -i \end{bmatrix} \right\}, \quad (8)$$

where $i=\sqrt{-1}$, and the second sub-codebook $C_2$ contains scalars $d_{k_2}$ given by:

$$C_2 = \{\pi, -\pi\} \quad (9).$$

Hence, the first sub-index $k_1$ is in this example represented by two bits whereas the second sub-index $k_2$ is represented by one bit only. Assuming that there are 10 sub-bands in a per sub-band feedback suitable for the PUSCH, then 2+10*1=12 bits are reported back. In a wideband feedback suitable for the PUCCH, 2+1=3 bits are fed back.

As mentioned above, it is possible to further reduce the feedback overhead to two bits by introducing dependencies between the P number of sub-indices. In a feedback container, in which the payload is very limited, it is possible to make a table of "allowed" pairs of P sub-indices. An example of this is shown in Table 1 below. Although the full codebook contains 8 elements and requires three bits, this has been reduced to two bits in the example in Table 1. To select which matrices that should be included in the table, it is possible to resort to different optimization methods, and for instance aim at maximizing the minimum Chordal distance between the remaining matrices.

TABLE 1

Example on how to reduce feedback overhead by introducing dependencies between codebook indices

| $k_1$ | $k_2$ | $W^i = \begin{bmatrix} M_{k_1} \\ M_{k_1} e^{j d_{k_2}} \end{bmatrix}$ |
| --- | --- | --- |
| 0 | 0 | $W^i = \begin{bmatrix} 1 \\ 1 \\ 1 \\ 1 \end{bmatrix}$ |
| 1 | 1 | $W^i = \begin{bmatrix} 1 \\ -1 \\ -1 \\ 1 \end{bmatrix}$ |
| 2 | 0 | $W^i = \begin{bmatrix} 1 \\ i \\ 1 \\ i \end{bmatrix}$ |
| 3 | 1 | $W^i = \begin{bmatrix} 1 \\ -i \\ -1 \\ i \end{bmatrix}$ |

It should also be noted that the matrices $W^i$ in the codebook C may used as PMIs, which is obvious to the skilled person.

Furthermore, the invention also relates to a method in a receive node, a method in a transmit node and devices thereof.

One embodiment method can be used in a transmit node for receiving and processing CSI between the transmit node and a receive node, where the CSI being represented by K number of matrices $W^i$ from a codebook C comprises a plurality of matrices. The method includes receiving a first sub-index $k_1$ and receiving at least one additional second sub-index $k_2$ for each one of the K number of matrices $W^i$. Each one of the K number of matrices $W^i$ which are indexed by said first $k_1$ and second $k_2$ sub-indices are reconstructed. The first $k_1$ and second $k_2$ sub-indices have different time-frequency reporting granularity. A transmit node device thereof is also disclosed in the present application.

Another embodiment method can be used in a receive node for reporting CSI between a transmit node and the receive node. The CSI being represented by K number of matrices $W^i$ from a codebook C comprises a plurality of matrices. In the embodiment method, the receive node reports a first sub-index $k_1$ and at least one additional second sub-index $k_2$ for each one of the K number of matrices $W^i$. Each one of the K number of matrices $W^i$ is indexed by the first $k_1$ and second $k_1$ sub-indices, and the first $k_1$ and second $k_2$ sub-indices have different time-frequency reporting granularity. A receive node device thereof is also disclosed in the present application.

It is also understood by the skilled person that the method in a transmit node and the method in a receive node may be modified, mutatis mutandis, according to the different embodiments of the method in a wireless communication system according to the present invention.

Figure 3:
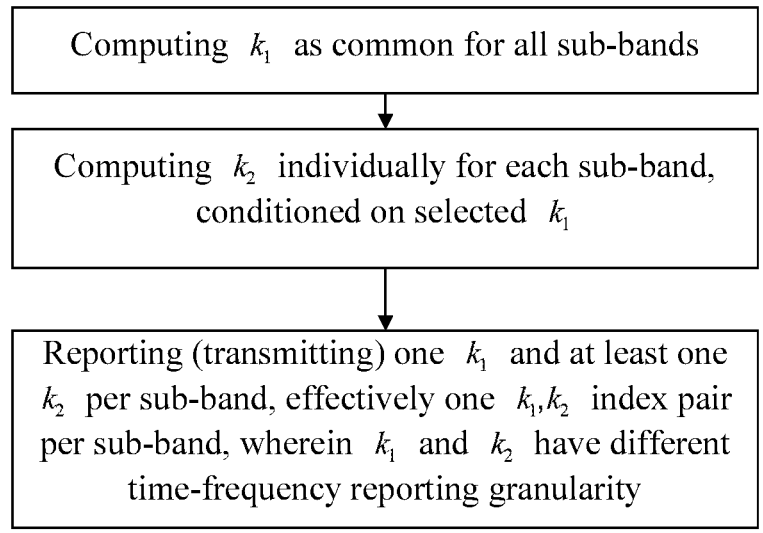
FIG. 3 is a flow chart of how a receive node may select a matrix index per sub-band and transmit a CSI report.

Moreover, an example flowchart of how a receive node, which reports the CSI to a transmit node, selects the matrix per each of the K number of sub-bands (i.e. sub-indices $k_1$, $k_2$ per sub-band in this particular example) and report back this information is given in FIG. 3.

Block 301: Computing $k_1$ as common for all sub-bands;
Block 303: Computing $k_2$ individually for each sub-band, conditioned on selected $k_1$;
Block 305: Reporting (transmitting) one $k_1$ and at least one $k_2$ per sub-band, effectively one $k_1$, $k_2$ index pair per sub-band, wherein $k_1$ and $k_2$ have different time-frequency reporting granularity.

Figure 4:
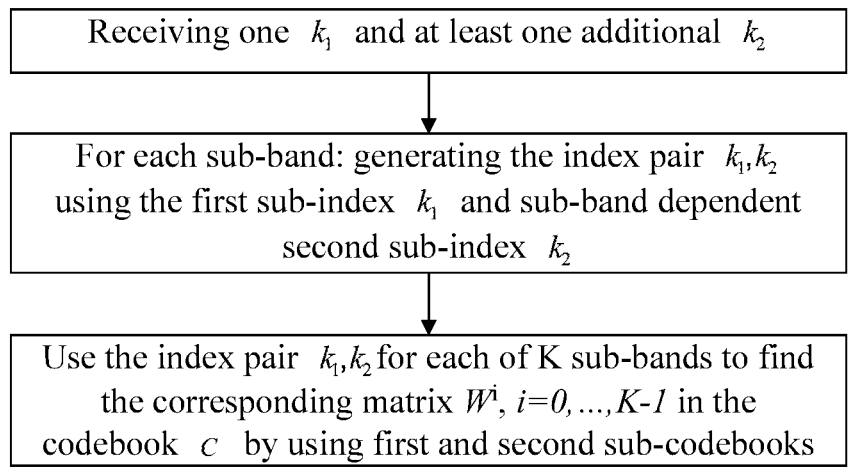
FIG. 4 is a flow chart of how a CSI per sub-band may be reconstructed by a transmit node of a CSI report received from a receive node.

In FIG. 4, an example flowchart is given of how a transmit node reconstructs the CSI for each of the K number of sub-bands.

Block 401: Receiving one $k_1$ and at least one additional $k_2$;
Block 403: For each sub-band: generating the index pair $k_1$, $k_2$ using the first sub-index $k_1$ and sub-band dependent second sub-index $k_2$;
Block 405: Use the index pair $k_1$, $k_2$ for each of K sub-bands to find the corresponding matrix $W^i$, i=0 ... K−1 in the codebook C by using first and second sub-codebooks.

In FIG. 4, The transmit node has received one first sub-index $k_1$ and K number of second sub-indices $k_2$ (one for each sub-band) and uses the sub-indices and the first and second sub-codebooks $C_1$ and $C_2$ for reconstructing the matrix $W^i$ for the i:th sub-band. The matrix $W^i$ hence represents the CSI for sub-band i and is a matrix in the codebook C.

Figure 8:
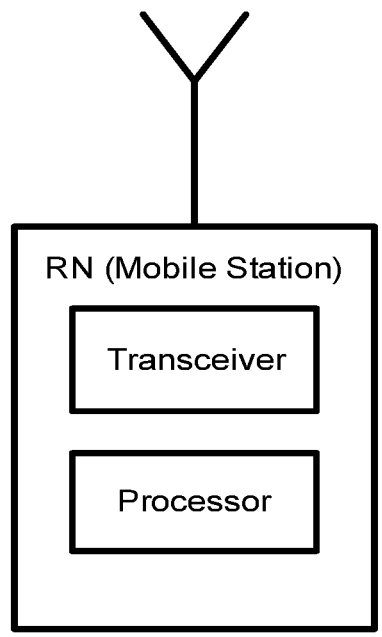
FIG. 8 shows a block diagram of a particular example of a RN, which is a mobile station having a processor and a transceiver for reporting channel state information in a multi-carrier cellular communication system.
Figure 9:
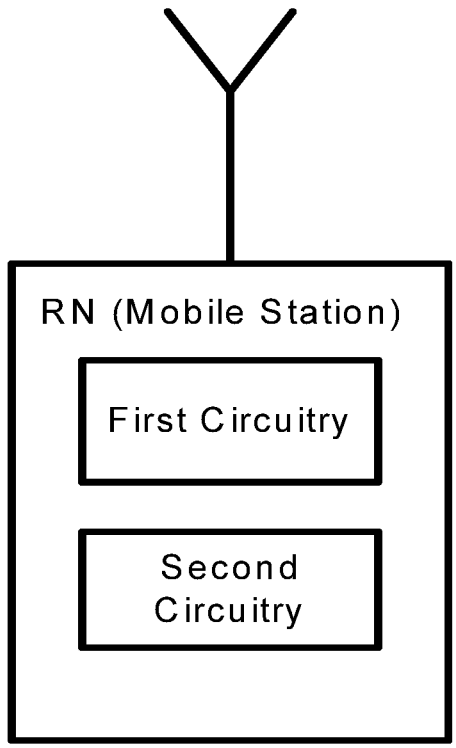
FIG. 9 shows a block diagram of another particular example of a RN, which is a mobile station having processing circuitries for reporting channel state information in a multi-carrier cellular communication system.

Furthermore, as understood by the person skilled in the art, the method in a receive node and the method in a transmit node according to the present invention may be implemented in a computer program, having code means, which when run in a computer causes the computer to execute the steps of the method. As particular examples, FIG. 8 illustrates a RN which is a mobile station having a transceiver and a processor for reporting channel state information, and FIG. 9 illustrates a RN which is a mobile station having processing circuitries in an apparatus for reporting channel state information. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

It should finally be understood that the present invention is not limited to the embodiments described above, but also relates to and incorporates all embodiments within the scope of the appended independent claims.

What is claimed is:

1. A non-transitory computer-readable storage medium comprising instructions which, when executed by a computer, cause the computer to carry out the steps of:
determining K matrices for K frequency sub-bands, wherein K precoding matrix indicators (PMIs) of the K frequency sub-bands respectively represent the K matrices, a plurality of sub-carriers in a multi-carrier cellular communication system is divided into the K frequency sub-bands, and K is an integer greater than 1;
determining a first sub-index and K second sub-indices, wherein each of the K matrices is indexed by the first sub-index and one of the K second sub-indices, and wherein each of K PMIs comprises the first sub-index and one of the K second sub-indices; and
transmitting, to a base station, the first sub-index and at least one of the K second sub-indices, wherein the first sub-index is common for all of the K frequency sub-bands, and each of the K second sub-indices is specific for a matrix that corresponds to one frequency sub-band of the K frequency sub-bands.

2. The non-transitory computer-readable storage medium according to claim 1, wherein
the first sub-index indicates a first sub-matrix from a first sub-codebook, and
a second sub-index in the K second sub-indices indicates a second sub-matrix from a second sub-codebook, wherein each one of the K matrices comprises the first sub-matrix and one of the K matrices comprises the second sub-matrix.

3. The non-transitory computer-readable storage medium according to claim 2, wherein
each one of the K matrices is represented as $W^i$, $0 \le i \le K-1$, and $$W^i = \begin{bmatrix} M_{k_1} \\ M_{k_1} M_{k_2}^i \end{bmatrix},$$

where $W^i$ represents the $i^{th}$ matrix, $k_1$ represents a first sub-index identifying a first sub-matrix $M_{k_1}$, and $k_2$ represents a second sub-index identifying a second sub-matrix $M_{k_2}^i$.

4. The non-transitory computer-readable storage medium according to claim 2, wherein
each one of the K matrices is represented as $W^i$, $0 \le i \le K-1$, and $$W^i = \begin{bmatrix} M_{k_1} \\ M_{k_2}^i M_{k_1} \end{bmatrix},$$

where $W^i$ represents the $i^{th}$ matrix, $k_1$ represents a first sub-index identifying a first sub-matrix $M_{k_1}$, $k_2$ represents a second sub-index identifying a second sub-matrix $M_{k_2}^i$.

5. The non-transitory computer-readable storage medium according to claim 2, wherein
each one of the K matrices is represented as $W^i$, $0 \le i \le K-1$, and $$W^i = M_{k_2}^i M_{k_1} \text{ or } W^i = M_{k_1} M_{k_2}^i,$$

where $W^i$ represents the $i^{th}$ matrix, $k_1$ represents a first sub-index identifying a first sub-matrix $M_{k_1}$, $k_2$ represents a second sub-index identifying second sub-matrix $M_{k_2}^i$.

6. The non-transitory computer-readable storage medium according to claim 2, wherein
each one of the K matrices is represented as $W^i$, $0 \le i \le K-1$, and $$W^i = \begin{bmatrix} M_{k_1} \\ M_{k_1} e^{jd_{k_2}} \end{bmatrix},$$

where $W^i$ represents the $i^{th}$ matrix, $k_1$ represents a first sub-index identifying a first sub-matrix $M_{k_1}$, $k_2$ represents a second sub-index identifying $d_{k_2}$, and $d_{k_2}$ represents a scalar.

7. The non-transitory computer-readable storage medium according to claim 1, wherein the multi-carrier cellular communication system is a long term evolution (LTE) system or a long term evolution advanced (LTE-A) system.

8. An apparatus in a mobile station, comprising:
a memory storing executable instructions; and
a processor coupled to the memory, the processor executing the executable instructions to:
determine a matrix for K frequency sub-bands, wherein the mobile station communicates with a base station in a multi-carrier cellular communication system having a plurality of sub-carriers, wherein the plurality of sub-carriers is divided into the K frequency sub-bands, K is an integer greater than 1, and the matrix is represented by a precoding matrix indicator (PMI);
determine a first sub-index from a plurality of first sub-indices and a second sub-index for the matrix from a plurality of second sub-indices; and
transmit, to a base station, the first sub-index and the second sub-index on a periodic physical uplink control channel (PUCCH) for the K frequency sub-bands,
wherein the first sub-index and the second sub-index are common for the K frequency sub-bands, the PMI comprises the first sub-index and the second sub-index, the plurality of the first sub-indices are a subset of all possible first sub-indices, the plurality of second sub-indices are a subset of all possible second sub-indices, and a quantity of combinations of the plurality of first sub-indices and second sub-indices is smaller than a quantity of possible combinations of all possible first sub-indices and second sub-indices.

9. The apparatus according to claim 8, wherein the matrix is one of a plurality of matrices, the first sub-index of the plurality of first sub-indices indicates a first sub-matrix from a first sub-codebook, and
the second sub-index of the plurality second sub-indices indicates a second sub-matrix from a second sub-codebook, wherein each one of the plurality of matrices comprises the first sub-matrix from the first sub-codebook and the second sub-matrix from the second sub-codebook.

10. The apparatus according to claim 9, wherein
each one of the plurality of matrices is represented as $W^i$, and $$W^i = \begin{bmatrix} M_{k_1} \\ M_{k_1} M_{k_2}^i \end{bmatrix},$$

where $W^i$ represents the $i^{th}$ matrix, $k_1$ represents the first sub-index identifying a first sub-matrix $M_{k_1}$, and $k_2$ represents a second sub-index identifying a second sub-matrix $M_{k_2}^i$.

11. The apparatus according to claim 9, wherein each one of the plurality of matrices is represented as $W^i$, and $$W^i = \begin{bmatrix} M_{k_1} \\ M_{k_2}^i M_{k_1} \end{bmatrix},$$

where $W^i$ represents the $i^{th}$ matrix, $k_1$ represents the first sub-index, identifying a first sub-matrix $M_{k_1}$, and $k_2$ represents a second sub-index identifying a second sub-matrix $M_{k_2}^i$.

12. The apparatus according to claim 9, wherein each one of the plurality of matrices is represented as $W^i$, and $$W^i = M_{k_2}^i M_{k_1} \text{ or } W^i = M_{k_1} M_{k_2}^i,$$

where $W^i$ represents the $i^{th}$ matrix, $k_1$ represents the first sub-index identifying a first sub-matrix $M_{k_1}$, and $k_2$ represents a second sub-index identifying a second sub-matrix $M_{k_2}^i$.

13. The apparatus according to claim 9, wherein each one of the plurality of matrices is represented as $W^i$, and $$W^i = \begin{bmatrix} M_{k_1} \\ M_{k_1} e^{jd_{k_2}} \end{bmatrix},$$

where $W^i$ represents the $i^{th}$ matrix, $k_1$ represents a first sub-index identifying a first sub-matrix $M_{k_1}$, $k_2$ represents a second sub-index identifying $d_{k_2}$, and $d_{k_2}$ represents a scalar.

14. The apparatus according to claim 8, wherein the multi-carrier cellular communication system is a long term evolution (LTE) system or a long term evolution advanced (LTE-A) system.

15. A non-transitory computer-readable storage medium comprising instructions which, when executed by a computer, cause the computer to carry out the steps of:
determining a matrix for K frequency sub-bands in a multi-carrier cellular communication system, wherein the multi-carrier cellular communication system has a plurality of sub-carriers, the plurality of sub-carriers is divided into the K frequency sub-bands, K is an integer greater than 1, and the matrix is represented by a precoding matrix indicator (PMI);
determining a first sub-index from a plurality of first sub-indices and a second sub-index for the matrix from a plurality of second sub-indices; and
transmitting, to a base station, the first sub-index and the second sub-index on a periodic physical uplink control channel (PUCCH) for the K frequency sub-bands,
wherein the first sub-index and the second sub-index are common for the plurality of frequency sub-bands, the PMI comprises the first sub-index and the second sub-index, the plurality of the first sub-indices are a subset of all possible first sub-indices, the plurality of second sub-indices are a subset of all possible second sub-indices, and a quantity of combinations of the plurality of first sub-indices and second sub-indices is smaller than a quantity of possible combinations of all possible first sub-indices and second sub-indices.

16. The non-transitory computer-readable storage medium according to claim 15, wherein the matrix is one of a plurality of matrices, the first sub-index of the plurality of first sub-indices indicates a first sub-matrix from a first sub-codebook, and
the second sub-index of the plurality of first sub-indices indicates a second sub-matrix from a second sub-codebook, wherein each one of the plurality of matrices comprises the first sub-matrix from the first sub-codebook and the second sub-matrix from the second sub-codebook.

17. The non-transitory computer-readable storage medium according to claim 16, wherein each one of the plurality of matrices is represented as $W^i$, and $$W^i = \begin{bmatrix} M_{k_1} \\ M_{k_1} M_{k_2}^i \end{bmatrix},$$

where $W^i$ represents the $i^{th}$ matrix, $k_1$ represents the first sub-index identifying a first sub-matrix $M_{k_1}$, and $k_2$ represents a second sub-index identifying a second sub-matrix $M_{k_2}^i$.

18. The non-transitory computer-readable storage medium according to claim 17, wherein each one of the plurality of matrices is represented as $W^i$, and $$W^i = \begin{bmatrix} M_{k_1} \\ M_{k_2}^i M_{k_1} \end{bmatrix},$$

where $W^i$ represents the $i^{th}$ matrix, $k_1$ represents the first sub-index identifying a first sub-matrix $M_{k_1}$, and $k_2$ represents a second sub-index identifying second sub-matrix $M_{k_2}^i$.

19. The non-transitory computer-readable storage medium according to claim 17, wherein each one of the plurality of matrices is represented as $W^i$, and $$W^i = M_{k_2}^i M_{k_1} \text{ or } W^i = M_{k_1} M_{k_2}^i,$$

where $W^i$ represents the $i^{th}$ matrix, $k_1$ represents the first sub-index identifying a first sub-matrix $M_{k_1}$, $k_2$ represents a second sub-index identifying second sub-matrix $M_{k_2}^i$.

20. The non-transitory computer-readable storage medium according to claim 16, wherein each one of the plurality of matrices is represented as $W^i$, and $$W^i = \begin{bmatrix} M_{k_1} \\ M_{k_1} e^{jd_{k_2}} \end{bmatrix},$$

where $W^i$ represents the $i^{th}$ matrix, $k_1$ represents the first sub-index identifying a first sub-matrix $M_{k_1}$, $k_2$ represents a second sub-index identifying $d_{k_2}$, and $d_{k_2}$ represents a scalar.

* * * * *